United States Patent
Le et al.

(10) Patent No.: US 11,758,309 B2
(45) Date of Patent: Sep. 12, 2023

(54) ANTENNA, TELEMETRIC DEVICE, AND TELEMETRIC MEASUREMENT SYSTEM

(71) Applicant: TOYOTA JIDOSHA KABUSHIKI KAISHA, Aichi-ken (JP)

(72) Inventors: Thanh Dinh Le, Toyota (JP); Kenichi Ichinose, Toyota (JP); Hiroshi Yoshimoto, Toyota (JP); Katsumi Matsuoka, Toyota (JP); Hiroshi Takenaka, Toyota (JP); Hironori Doi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/738,005

(22) Filed: May 6, 2022

(65) Prior Publication Data

US 2023/0007911 A1    Jan. 12, 2023

(30) Foreign Application Priority Data

Jul. 12, 2021   (JP) .................................. 2021-115039

(51) Int. Cl.
*H04Q 9/00* (2006.01)
*H01Q 9/04* (2006.01)
*H02J 50/20* (2016.01)
*H02K 11/00* (2016.01)
*H02K 11/20* (2016.01)

(52) U.S. Cl.
CPC ............. *H04Q 9/00* (2013.01); *H01Q 9/0421* (2013.01); *H02J 50/20* (2016.02); *H02K 11/0094* (2013.01); *H02K 11/20* (2016.01); *H04Q 2209/886* (2013.01)

(58) Field of Classification Search
CPC .. H04Q 9/00; H04Q 2209/886; H01Q 9/0421; H02J 50/20; H02K 11/0094; H02K 11/20
See application file for complete search history.

(56) References Cited

U.S. PATENT DOCUMENTS

| | | | | |
|---|---|---|---|---|
| 4,649,391 A | * | 3/1987 | Tsuda .................... | H01Q 25/02 343/789 |
| 5,798,734 A | * | 8/1998 | Ohtsuka ............... | H01Q 9/0407 343/846 |
| 2020/0295437 A1 | * | 9/2020 | Ueda ...................... | H01Q 21/20 |
| 2021/0044007 A1 | * | 2/2021 | Sudo ....................... | H01Q 1/38 |
| 2021/0135366 A1 | * | 5/2021 | Sampo .................... | H01Q 5/35 |
| 2022/0278456 A1 | * | 9/2022 | Wang .................... | H01Q 9/0435 |

FOREIGN PATENT DOCUMENTS

| | | |
|---|---|---|
| EP | 2532174 B1 | 4/2018 |
| JP | H88710 A | 1/1996 |
| JP | 2013218439 A | 10/2013 |

* cited by examiner

*Primary Examiner* — Amine Benlagsir
(74) *Attorney, Agent, or Firm* — HAUPTMAN HAM, LLP

(57) ABSTRACT

An antenna includes: a dielectric substrate; a conductive plane formed on a back surface of the dielectric substrate; a radiating element having a linear shape and formed on a front surface of the dielectric substrate; a shorting pin connecting one end of the radiating element to the conductive plane; and a power supply pin that is connected to the radiating element, at a point a predetermined distance away from the one end to which the shorting pin is connected, through a hole provided in the conductive plane, and that supplies a transmission signal to the radiating element. A radio wave is emitted from the radiating element.

19 Claims, 12 Drawing Sheets

TARGET FREQUENCY

TARGET FREQUENCY

FLUCTUATIONS (ΔP1) IN SINGLE ANTENNA SET

FLUCTUATIONS (ΔP) IN MULTIPLE ANTENNA SETS

ANTENNA, TELEMETRIC DEVICE, AND TELEMETRIC MEASUREMENT SYSTEM

CROSS-REFERENCE TO RELATED APPLICATION

This application claims priority to Japanese Patent Application No. 2021-115039 filed on Jul. 12, 2021, incorporated herein by reference in its entirety.

BACKGROUND

1. Technical Field

The disclosure relates to state measurement of rotating members, such as rotors, in rotating machines, including engines and motors.

2. Description of Related Art

Rotating machines, including motors (electric motors) that use electric power and engines (internal combustion engines) and steam engines that use fuel, are widely used as motive power sources for various types of machines. In such rotating machines, it may be desirable to detect the states of rotating members, for example, the temperature, torque (stress), and speed of a rotor in a motor.

Japanese Unexamined Patent Application Publication No. 2013-218439 describes a telemetric measurement system that detects a state of (vibrational stress on) a rotor blade in a steam turbine that is a rotating machine having rotor blades. In this telemetric measurement system, the rotor blade is equipped with a telemeter including a sensor for state detection, a transmission unit that transmits detection information of the sensor as wireless information, a secondary battery that supplies electric power to the sensor and the transmission unit, and charging means for supplying charging power to the secondary battery. The charging means receives power transmitted from a power transmission coil on a fixed side by a power reception coil and charges the secondary battery with the received power.

This telemetric measurement system can charge the secondary battery as needed and thereby extend the duration of continuous measurement.

Telemetric measurement systems for rotating machines are also shown in Japanese Unexamined Patent Application Publication No. 8-8710, EP 2532174 B1, etc.

SUMMARY

Being members on a side where motive power is output, rotating members (rotors, rotor blades, and the like) of rotating machines are designed so as to eliminate superfluities as far as possible. To meet conditions for strength etc., rotating machines are often made of metal materials. Thus, telemetric measurement systems face the following challenges:
- Devices on a rotating side need to be appropriately disposed in a small space.
- An antenna that is a device on the rotating side is susceptible to the influence of surrounding metal objects, such as a stator, a rotor, and a motor housing case.

The disclosure provides an antenna capable of appropriate communication even in a small space surrounded by many metal objects, a telemetric device, and a telemetric measurement system using these antenna and telemetric device.

An antenna according to the disclosure includes: a dielectric substrate; a conductive plane formed on a back surface of the dielectric substrate; a radiating element having a linear shape and formed on a front surface of the dielectric substrate; a shorting pin connecting one end of the radiating element to the conductive plane; and a power supply pin that is connected to the radiating element through the dielectric substrate, at a point a predetermined distance away from the one end to which the shorting pin is connected, and that supplies a transmission signal to the radiating element, wherein a radio wave is emitted from the radiating element.

The power supply pin may pass through the inside of the dielectric substrate and reach the side of the back surface through a hole provided in the conductive plane.

The power supply pin may extend over the dielectric substrate and reach the side of a side surface.

The planar shape of the dielectric substrate in a plane parallel to the front surface and the back surface may be a quadrangle curved into an arc shape, and the planar shapes of the conductive plane and the radiating element may also be quadrangles curved into arc shapes.

The profile shape of the dielectric substrate orthogonal to the front surface and the back surface may be a quadrangle curved into an arc shape, and the profile shapes of the conductive plane and the radiating element may also be quadrangles curved into arc shapes.

A telemetric device according to the disclosure includes: a sensor unit that obtains a detection signal; a processor that processes the detection signal from the sensor unit to obtain a transmission signal; and a transmission antenna that transmits the transmission signal from the processor. The antenna configured as described above may be used as the transmission antenna.

Two antennas, a first transmission antenna and a second transmission antenna, may be provided as the transmission antenna, and the first and second transmission antennas may emit the same transmission signals.

The telemetric device may further include a power reception unit that receives a radio wave from the outside and outputs electric power, and the electric power from the power reception unit may be supplied to the sensor unit and the processor.

In a telemetric measurement system according to the disclosure, the above-described telemetric device is mounted on a rotating member of a rotating machine, and a reception antenna that receives the transmission signal from the transmission antenna of the telemetric device is provided on a fixed member of the rotating machine.

The transmission antenna according to the disclosure is relatively small and can perform reliable wireless communication. When this antenna is mounted on a rotating member of a rotating machine, communication about the status of the rotating member can be effectively performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure will be described below based on the drawings. The disclosure is not limited to the embodiment described herein.

System Configuration

Figure 1:
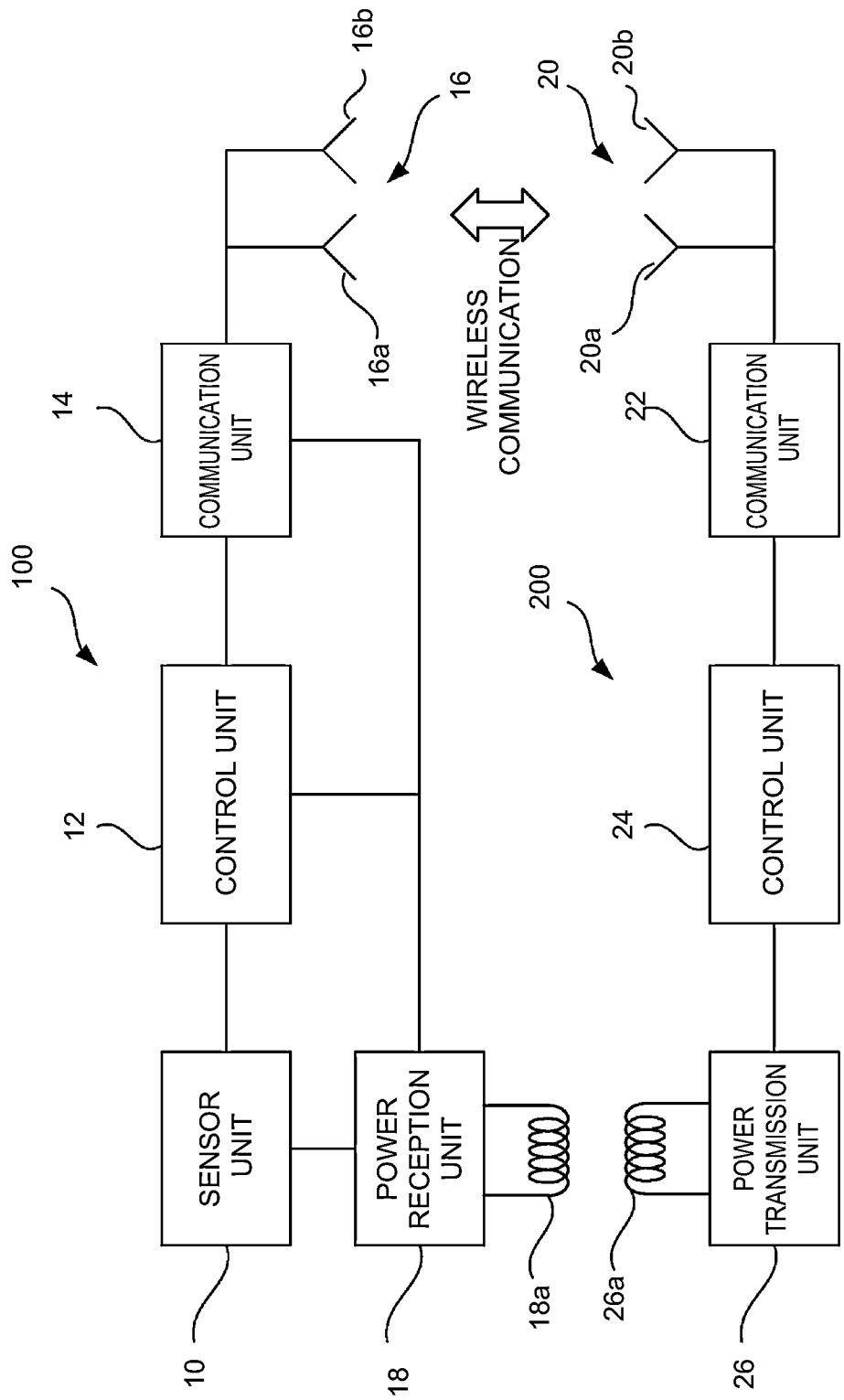
FIG. 1 is a block diagram showing the configuration of a telemetric measurement system.

FIG. 1 is a block diagram showing the configuration of a telemetric measurement system. The telemetric measurement system includes a rotating-side system 100 provided on a rotating side and a fixed-side system 200 provided on a fixed side. Here, the telemetric measurement system according to this embodiment detects states of a rotor and a shaft (rotating members) of an electric motor that is one example of rotating machines. Therefore, the rotating-side system 100 is provided on the rotor and the fixed-side system 200 is provided inside a housing case. The rotating-side system 100 is referred to as a telemetric device.

The rotating-side system 100 has a sensor unit 10. The sensor unit 10 includes one or more sensors. Examples of the sensors include a temperature sensor, a speed sensor, and a torque sensor. The temperature sensor and the speed sensor can be mounted on the rotor, and the torque sensor can be mounted on a rotating shaft of the rotor.

The sensor unit 10 supplies detection signals of one or more sensors to a control unit 12. The control unit 12 performs necessary processing on a detection signal from a sensor, such as converting the signal into digital data and storing the data, or converting the detection signal into an appropriate value as a detection value, and supplies the processed signal to a communication unit 14.

The communication unit 14 has a local oscillator that generates a carrier wave of a predetermined frequency, and modulates this carrier wave by the detection signal. Two transmission antennas 16 (16a, 16b) are connected to the communication unit 14, and radio waves for wireless communication that have been modulated by the detection signal are emitted from these two transmission antennas 16a, 16b.

The rotating-side system 100 has a power reception unit 18 including a power reception coil 18a. The power reception unit 18 includes a rectifier circuit and a secondary battery, and receives electric power of a predetermined frequency transmitted thereto from an outside by the power reception coil 18a, rectifies the received power into a direct current, and stores the direct current in the secondary battery. The power reception unit 18 supplies electric power for operation to members of the rotating-side system 100.

The control unit 12, the communication unit 14, etc. can be formed by processors that perform signal processing, and processors can also take charge of signal processing in the sensor unit 10, operation control in the power reception unit, etc.

The fixed-side system 200 has reception antennas 20 (20a, 20b), and the reception antennas 20a, 20b receive radio waves from the transmission antennas 16a, 16b and supply the radio waves to a communication unit 22. The communication unit 22 performs reception processing on the received radio waves, and takes out and outputs a detection signal that is a modulated signal.

The obtained detection signal is supplied to a control unit 24, where the detection signal is stored as data on a detection result of the sensor, and this data is displayed as an operating state of the motor or used in various modes of control of the motor.

The fixed-side system 200 is provided with a power transmission unit 26 including a power transmission coil 26a. The power transmission unit 26 receives electric power supply from an external power source, for example, a commercial power source, and supplies predetermined transmission power to the power transmission coil 26a. The power transmission coil 26a and the power reception coil 18a of the rotating-side system 100 are electromagnetically coupled to each other, and the transmission power from the power transmission coil 26a is received by the power reception coil 18a and accumulated in the secondary battery of the power reception unit 18 as described above.

The control unit 24, the communication unit 22, etc. can be formed by processors that perform signal processing, and processors can also take charge of operation control in the power transmission unit etc. The transmission antenna 16 and the reception antenna 20 can also perform bidirectional communication with each other.

Configuration when System is Installed in Motor

Figure 2:
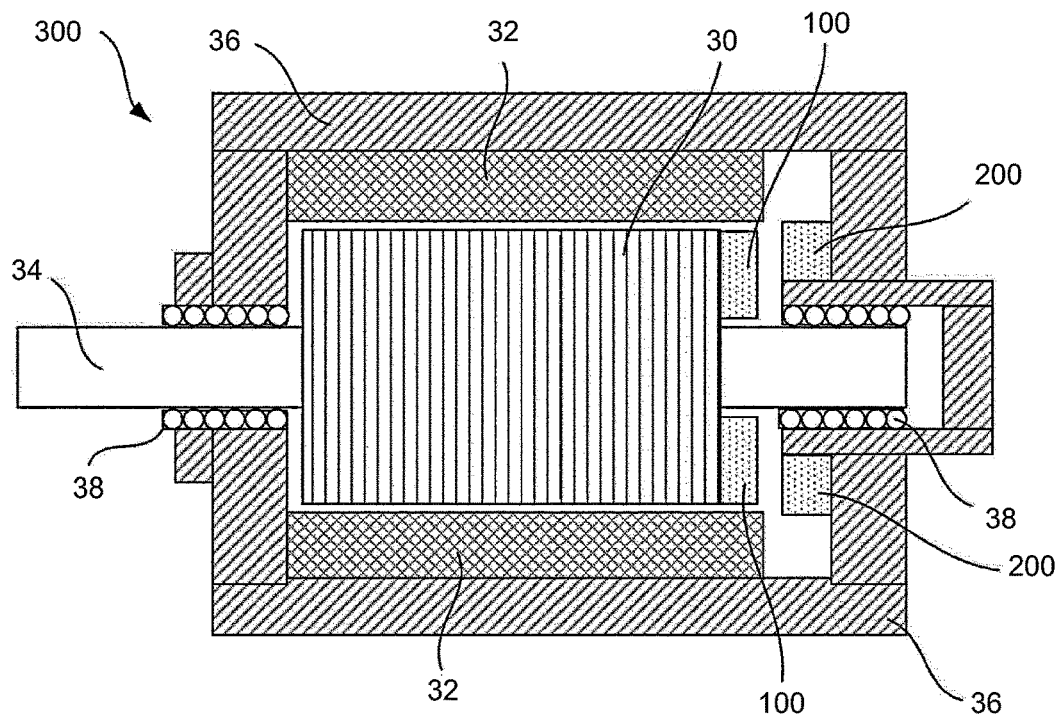
FIG. 2 is a view showing a configuration when the telemetric measurement system is installed inside a motor 300.

FIG. 2 is a view showing a configuration when the telemetric measurement system is installed inside a motor 300.

The motor 300 includes a cylindrical rotor 30, and an annular stator 32 that is formed so as to surround the circumference of the rotor 30, with a predetermined clearance left therebetween. The rotor 30 has a predetermined number of poles formed by, for example, permanent magnets embedded therein, and the stator 32 forms a predetermined rotating magnetic field by a stator coil. A shaft 34 is disposed at the center of the rotor 30 in an axial direction, and a rotation driving force is output from the shaft 34. A case 36 is provided so as to cover the entire motor 300, and the shaft 34 is supported on the case 36 through bearings 38 at both sides of the rotor 30. Members that do not rotate, including the stator 32, the case 36, and the bearings 38, constitute fixed members.

The rotating-side system 100 having an annular shape is disposed on one end surface of the rotor 30 in the axial direction (the right end surface of the rotor 30 in FIG. 2). The fixed-side system 200 is disposed on an inner surface of the case 36 that faces the rotating-side system 100 (the inner surface of the case on the right side in FIG. 2).

In a state where the motor 300 is used, the rotor 30 is rotated by the rotating magnetic field generated by the stator 32. Therefore, the annular rotating-side system 100 also rotates around the shaft 34.

In this embodiment, the fixed-side system 200 has a hollow cylindrical shape. Since the fixed-side system 200 is fixed, the rotating-side system 100 and the fixed-side system 200 rotate and move relatively to each other. In a rotating state, the rotating-side system 100 wirelessly communicates with the fixed-side system 200 and receives electric power supply from the fixed-side system 200.

Figure 3:
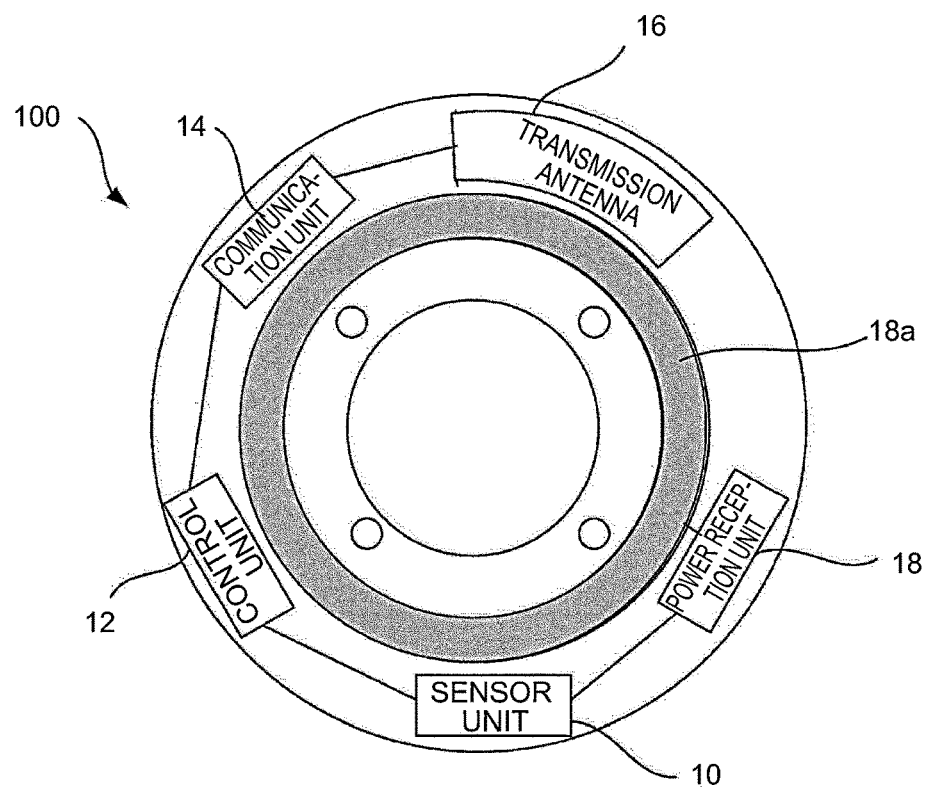
FIG. 3 is a schematic view showing the configuration of a rotating-side system 100.

FIG. 3 is a schematic view showing the configuration of the rotating-side system 100. In this example, the power reception coil 18a is an annular coil disposed on an inner circumferential side of the annular rotating-side system 100. The power transmission coil 26a of the fixed-side system 200 is an annular coil disposed so as to face the power reception coil 18a, and these coils are electromagnetically coupled to each other. The magnetic field of the power transmission coil 26a generates an induced current in the power reception coil 18a and transfers electric power thereto.

In an annular region on an outer side of the power reception coil 18a, the sensor unit 10, the control unit 12, the communication unit 14, and the transmission antenna 16 are disposed. These parts are connected to one another by wiring and receive electric power supply from the power reception unit 18.

Arrangement of Antennas

Figure 4:
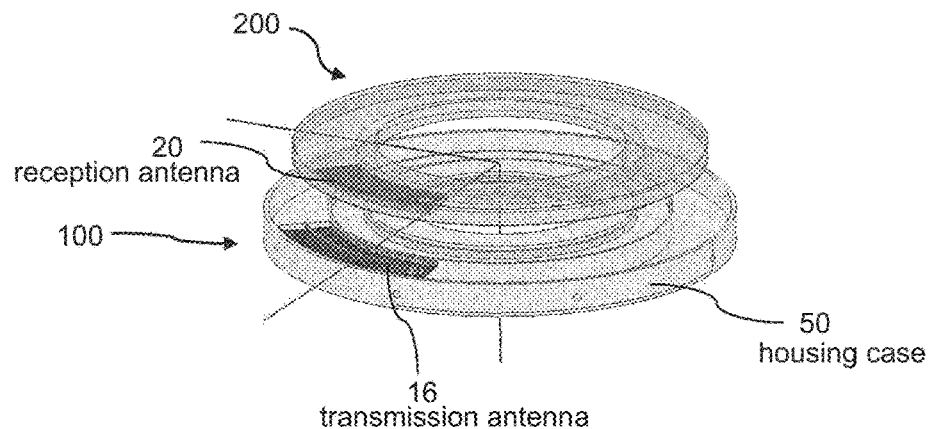
FIG. 4 is a view showing arrangement of the rotating-side system 100 and a fixed-side system 200.

FIG. 4 is a view showing the arrangement of the rotating-side system 100 and the fixed-side system 200. In this example, the rotating-side system 100 is mounted on an end surface of the rotor in the axial direction, and the fixed-side system 200 is disposed so as to face the rotating-side system 100 in the axial direction. Depiction of the members of the rotating-side system 100 and the fixed-side system 200 is omitted.

In this example, the transmission antenna 16 and the reception antenna 20 are similarly curved into arc shapes and the two face each other in the axial direction. The transmission antenna 16 and the reception antenna 20 are curved into arc shapes. The rotating-side system 100 has a doughnut-shaped housing case 50, which houses the members inside.

Configuration of Antennas

Figure 5A:
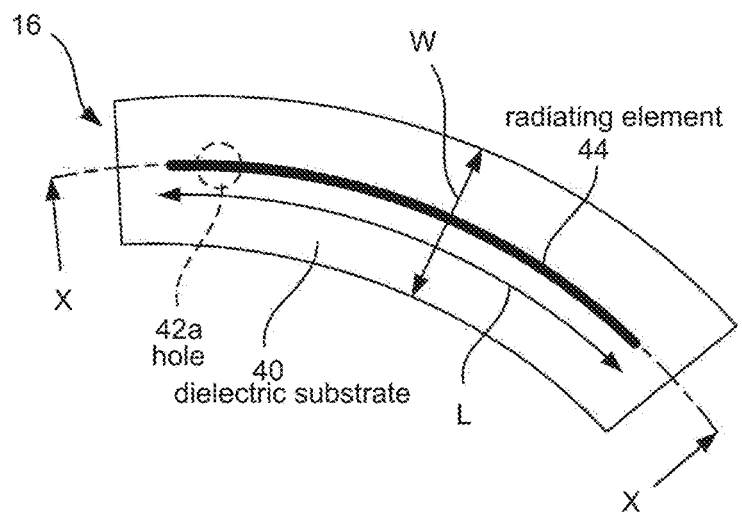
FIG. 5A is a plan view showing one example of the configuration of an antenna 16 (20)
Figure 5B:
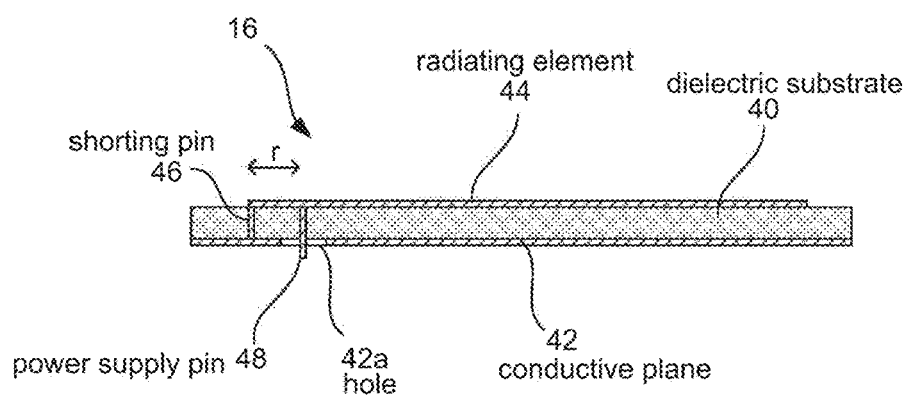
FIG. 5B is a sectional view, taken along line X-X, of the configuration of the antenna 16 (20) shown in FIG. 5A.
Figure 5C:
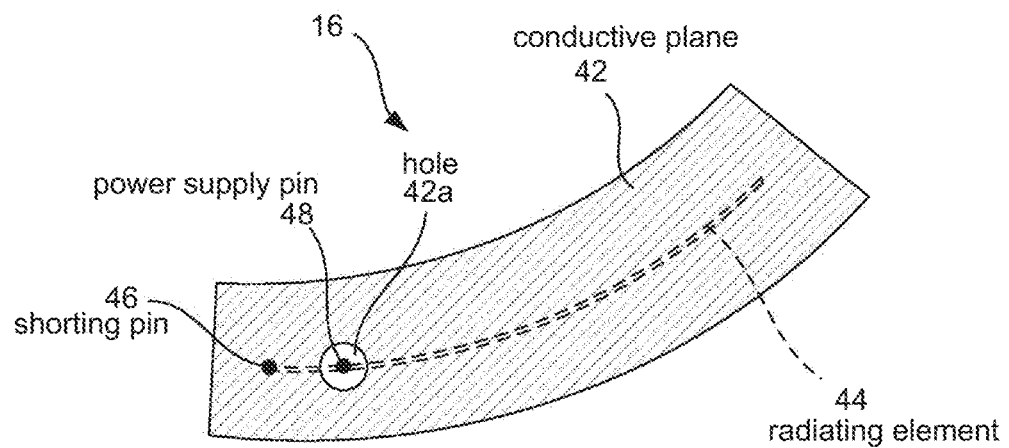
FIG. 5C is a bottom view of the antenna 16 (20) shown in FIG. 5A.

FIGS. 5A, 5B, and 5C are views showing one example of the configuration of the antenna 16 (20) that can be used as both the transmission antenna 16 and the reception antenna 20, with FIG. 5A being a view showing a planar shape, FIG. 5B being a sectional view showing a profile shape, and FIG. 5C being a bottom view.

The antenna 16 (20) has a dielectric substrate 40. The dielectric substrate 40 has a flat plate shape that is a quadrangle curved into an arc shape in a plane parallel to a front surface and a back surface thereof. As with common circuit boards, various types of ceramics, glass epoxy substrates (FR-4 grade), and the like can be used as the dielectric substrate 40, and bendable plastic materials and the like are also usable.

A conductive plane 42 made of a conductive material like copper or aluminum is formed on the back surface of the dielectric substrate 40. In this example, the conductive plane 42 is formed over the entire back surface of the dielectric substrate 40. The conductive plane 42 need not be formed on the entire surface of the dielectric substrate 40.

A radiating element 44 having a linear shape is formed on the front surface of the dielectric substrate 40. Like the dielectric substrate 40, the radiating element 44 is curved into an arc shape and made of a conductor, such as copper or aluminum. The size of the radiating element 44 is set to be smaller than that of the conductive plane 42, and the radiating element 44 is located on an inner side in the plane of the conductive plane 42 as seen in a plan view.

A shorting pin 46 is connected to one end of the radiating element 44 (the left end in FIG. 5A to FIG. 5C), and the shorting pin 46 extends through the dielectric substrate 40 (through a via hole) and is connected to the conductive plane 42 on the back surface.

A power supply pin 48 that is a 50Ω power supply wire is connected to the radiating element 44, at a point a little (a predetermined distance: a few millimeters) away from the one end of the radiating element 44 (the connection point of the shorting pin 46). The power supply pin 48 extends through the dielectric substrate 40 to the back surface side, and a corresponding part of the conductive plane 42 is cut out in a circular shape with a diameter of a few millimeters, for example, to form a hole 42a. Thus, the power supply pin 48 is connected to a power supply cable (not shown) without being connected to the conductive plane 42. A transmission signal from the power supply cable is supplied to the radiating element 44 through the power supply pin 48 and emitted as a radio wave from the radiating element 44. The method for providing the power supply pin is not limited to the method of connecting the power supply pin through the hole provided in the conductive plane. As will be described later, it is also possible to provide a power supply wire on the front surface of the dielectric substrate in a direction such as toward a side surface, at a point on the linear radiating element a predetermined distance away from the one end to which the shorting pin is connected. Connecting the power supply pin 48 to the radiating element 44 by having it extending through the dielectric substrate 40 or passing over the dielectric substrate 40 is referred to as connecting the power supply pin 48 through the dielectric substrate 40.

The length of the radiating element 44 (the length from the one end to which the shorting pin is connected to the other end) is basically, for example, about a quarter of the wavelength (λ) of the transmission radio wave, and can be made shorter than this length.

The antenna 16 (20) as described above can be formed by forming the radiating element 44 etc. by etching on a small-size printed circuit board.

Here, a specific example of the antenna 16 (20) will be described. First, the frequency of the transmission radio wave is, for example, about 1 GHz, and the wavelength thereof is a few hundred millimeters.

The conductive plane 42 has an arc shape extending in a circumferential direction at an angle of 50 degrees, and has, for example, an inside radius of 46 mm, an outside radius of 60 mm, and a width of 14 mm. The radiating element 44 spans an angle of 48 degrees with a radius of 52.5 mm and has a length of 44 mm. An angular difference between the shorting pin 46 and the power supply pin 48 is three degrees, and the power supply pin 48 is located at an angle of five degrees from the end of the dielectric substrate 40.

The width of the antenna (20) (the width of the conductive plane: w) can be adjusted according to the case of the rotating-side system. The size of the antenna (20) can also be changed to a larger size while keeping S 11 thereof relatively low. According to an experiment, the width of the conductive plane 42 is preferably 4 mm or larger, and a good result was produced when the width was 14 mm, for example. The S11 parameter is a parameter representing a ratio of reflected signals to input signals.

Matching, i.e., impedance matching between the antennas 16 (20) can be achieved through an interval r between the shorting pin 46 and the power supply pin 48, and the S11 characteristic can be thereby improved.

Figure 6:
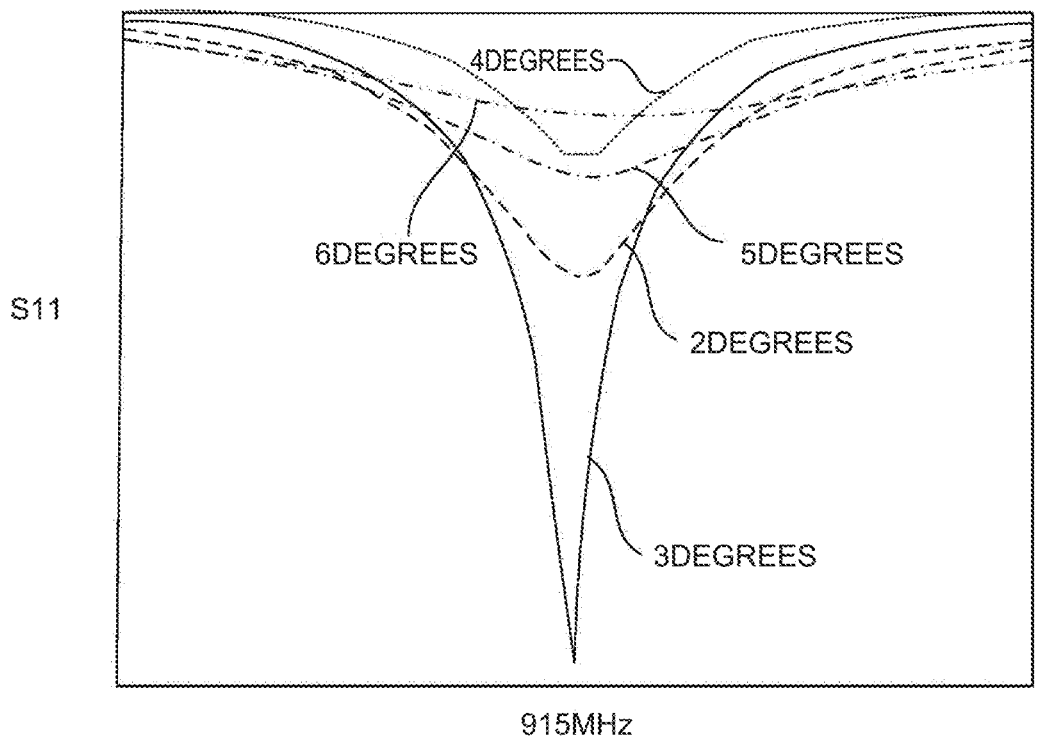
FIG. 6 is a graph showing values of the S11 parameter when an interval r is varied between two degrees and six degrees in the antenna 16 (20)

FIG. 6 is a graph showing the values of the S11 parameter when the interval r is varied between two degrees and six degrees in the antenna 16 (20). As shown, the characteristic is extremely good at −30 dB when the interval r is three degrees. The value is a few tens of decibels below zero when the interval r is two degrees.

In this embodiment, to match the shape of the end surface of the rotor 30, the shape of the transmission antenna 16 is a concentric arc shape. Thus, the small area of the end surface of the rotor 30 can be effectively utilized. As shown in FIG. 4, when the reception antenna 20 in the fixed-side system 200 has the same shape, good communication can be performed even when the systems are rotating relatively to each other.

In this embodiment, the radiating element 44 is formed on the front surface of the dielectric substrate 40 and the conductive plane 42 is formed on the back surface. By setting the distance between the shorting pin 46 and the power supply pin 48 to an appropriate distance, impedance matching between the antennas 16 (20) can be achieved and the S11 parameter can be reduced. As a result, the influence of metal objects, including the rotor 30, on the radiating element 44 (the antennas 16 (20)) also decreases. In other words, the antennas 16 (20) undergo little change in their antenna characteristics even when disposed near the rotor 30, the stator 32, and the case 36.

Figure 7:
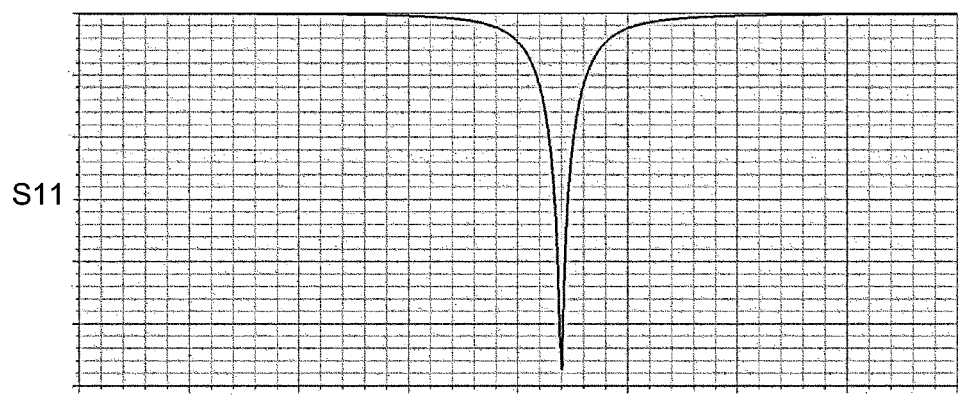
FIG. 7 is a graph showing the S11 parameter of the antenna 16 (20) when the antenna 16 (20) is disposed in a plastic case.

FIG. 7 is a graph showing the S11 parameter of the antenna 16 (20) when the antenna 16 (20) is disposed in a plastic case. As with the S11 parameter shown in FIG. 6, the value is relatively low at an intended frequency (about −30 dB at a target frequency of 915 MHz).

Figure 8:
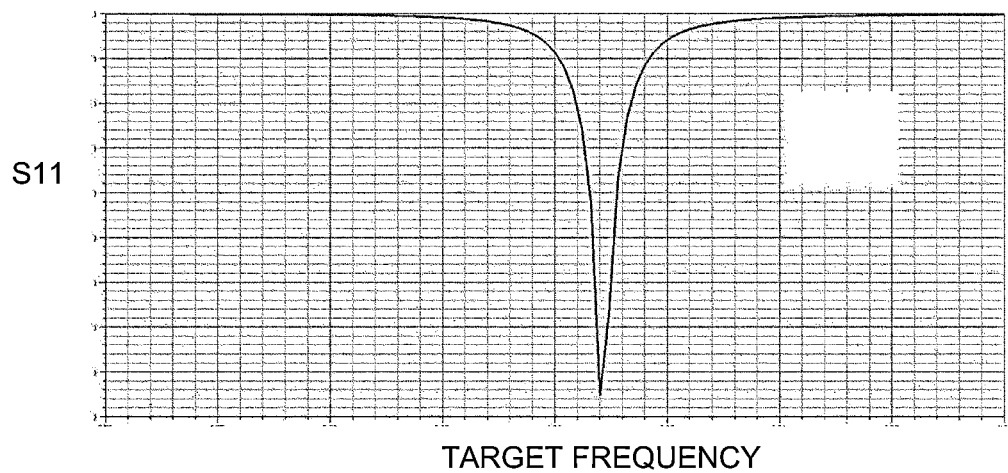
FIG. 8 is a graph showing the S11 parameter when the antenna 16 (20) is disposed inside a motor.

FIG. 8 is a graph showing the S11 parameter when the antenna 16 (20) is disposed inside a motor as shown in FIG. 2. As shown, the antenna 16 (20) exhibited almost the same characteristic as when disposed in a plastic case. This demonstrates that the antenna 16 (20) of this embodiment is suitable for a case where there is a metal member around it, as in a rotating electric machine.

Figure 9:
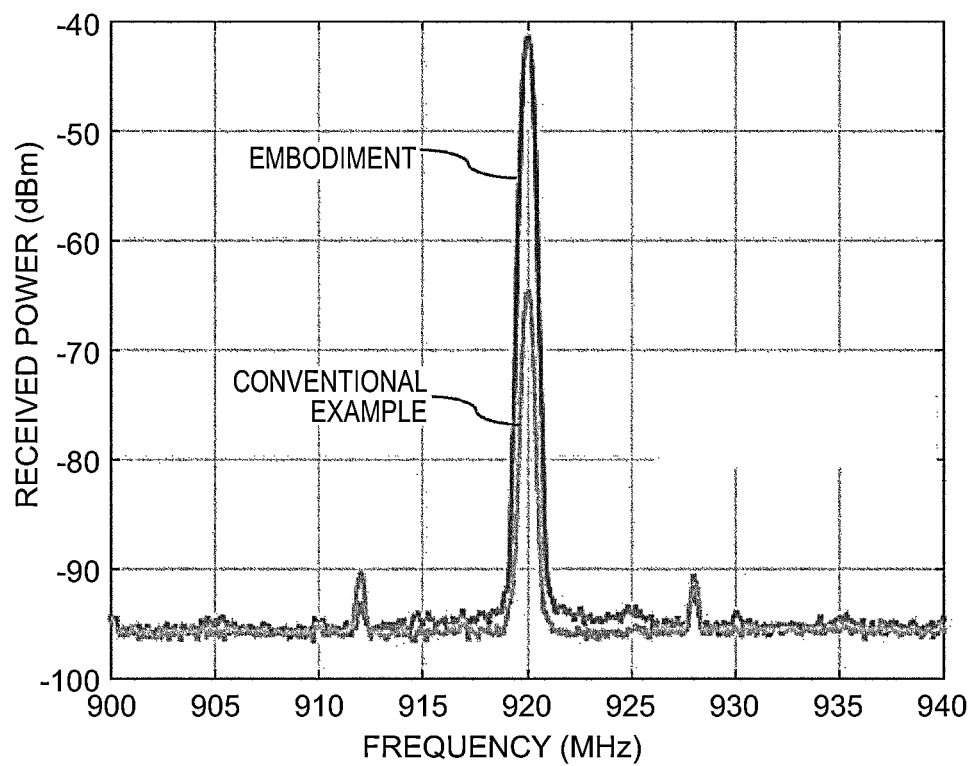
FIG. 9 is a graph showing a comparison in electric power received by a receiver between a conventional quarter-wavelength wire antenna and the antenna 16 (20) of an embodiment.

FIG. 9 is a graph showing a comparison in electric power received by a receiver between a conventional quarter-wavelength wire antenna and the antenna 16 (20) of this embodiment. As shown, the received power of the antenna of the embodiment is about 25 dB higher than that of the conventional wire antenna.

Figure 10:
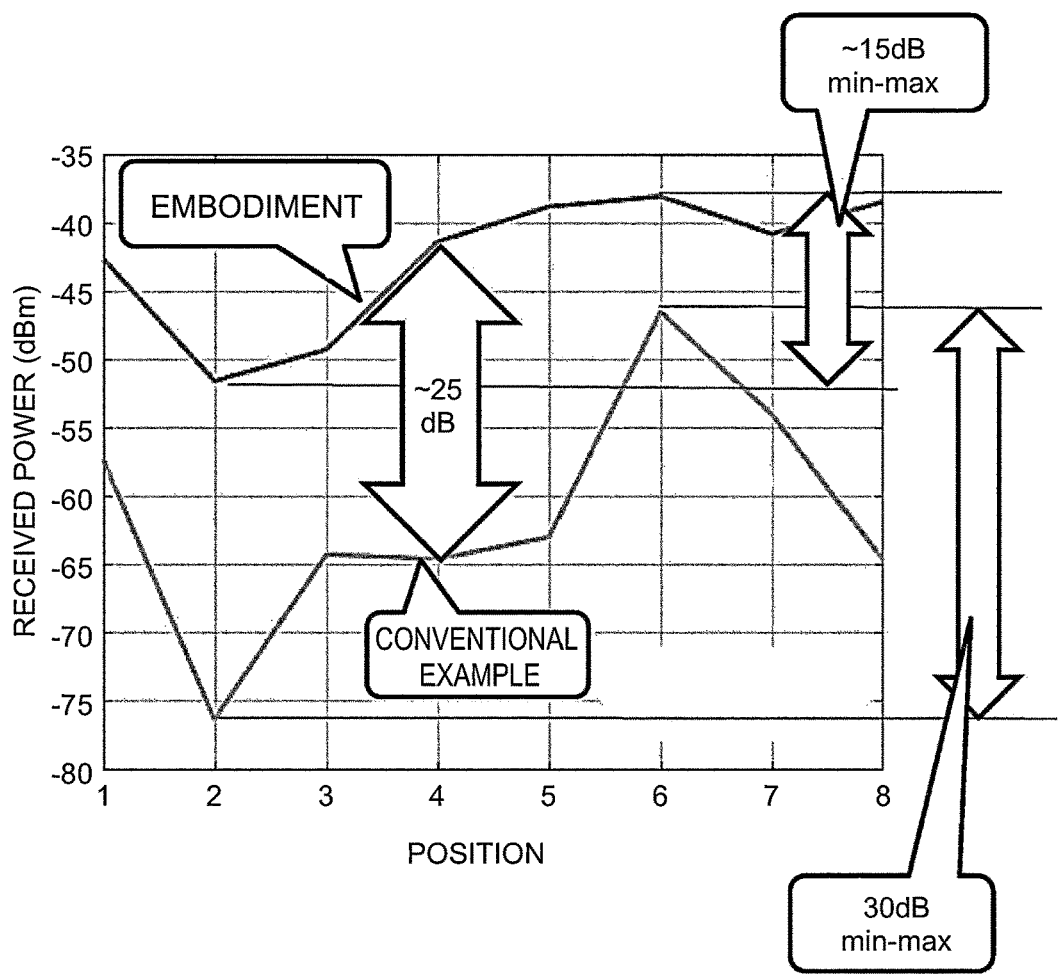
FIG. 10 is a graph showing fluctuations in received power according to the position of the antenna 16 (20) during one rotation of a rotor.

FIG. 10 is a graph showing fluctuations in received power according to the position of the antenna 16 (20) during one rotation of the rotor. As shown, the received power in the case of the antenna 16 (20) of the embodiment has a fluctuation of about 15 dB, which is smaller than about 30 dB in the case of the conventional antenna. This demonstrates that the antenna 16 (20) can perform stable communication.

The antenna 16 (20) of the embodiment exhibits far better characteristics than the conventional wire antenna. As a result, better wireless communication between the rotating-side system 100 and the fixed-side system 200 becomes possible. While it is also possible to use the antenna 16 (20) according to the embodiment as only one of the transmission antenna 16 and the reception antenna 20, adopting the configuration of the antenna 16 (20) for both the transmission antenna 16 and the reception antenna 20 can achieve extremely good wireless communication characteristics.

The advantages of the antenna 16 (20) according to the embodiment are enumerated below:

(i) Excellent characteristics can be achieved even when the transmission antenna is placed in a small space where there are many metal objects, such as a rotor, a stator, and a housing case;
(ii) The antenna is a small lightweight one that can be installed in a small space;
(iii) The antenna can be used as both the transmission antenna 16 and the reception antenna 20;
(iv) Compared with a conventional wire antenna, the antenna can produce strong reception signals;
(v) Compared with a conventional wire antenna, the antenna can produce more stable reception signals; and
(vi) The antenna has a simple structure and can be manufactured at a relatively low cost.

Configuration Using Multiple Antenna Sets

In the above-described example, the rotating-side system 100 and the fixed-side system 200 have one transmission antenna 16 and one reception antenna 20, respectively (a single antenna set). Thus, communication using only one pair of transmission antenna 16 and reception antenna 20 is performed.

Figure 11:
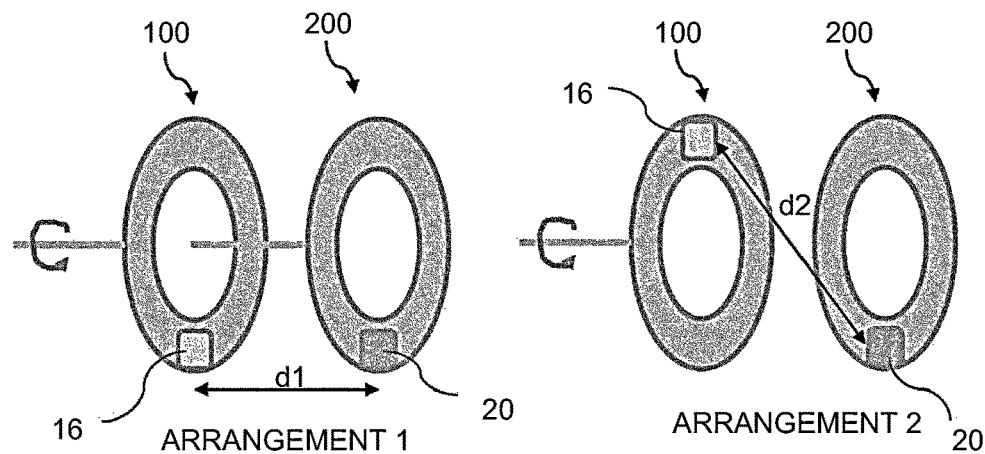
FIG. 11 is a view showing distances d1, d2 between transmission and reception antennas corresponding to positional relationships (arrangement 1, arrangement 2) between the transmission antenna 16 and the reception antenna 20 according to the position of the rotating rotor.

FIG. 11 is a view showing distances d1, d2 between the transmission and reception antennas corresponding to positional relationships (arrangement 1, arrangement 2) between the transmission antenna 16 and the reception antenna 20 according to the position of the rotating rotor. As shown, the distance between the transmission antenna 16 and the reception antenna 20 varies between the distance d1 when the antennas are in the same phase and the distance d2 when their phases (angles in the circumferential direction) are 180 degrees apart from each other. Thus, the distance between the transmission antenna 16 and the reception antenna 20 varies as the rotor rotates, and varies rapidly when the rotation speed is high.

Figure 12:
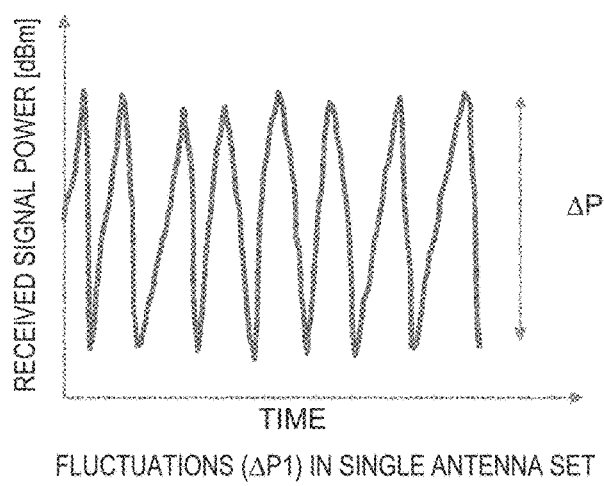
FIG. 12 is a graph showing changes over time in received signal power (intensity of a received signal) in the example of FIG. 11.

FIG. 12 is a graph showing changes over time in the received signal power (the intensity of the received signal) in the state of FIG. 11. The received signal power fluctuates greatly (fluctuation amount ΔP) according to the change in the distance. In some cases, the received signal undergoes fading, so that the rotating-side system 100 cannot provide accurate measurement data.

Figure 13:
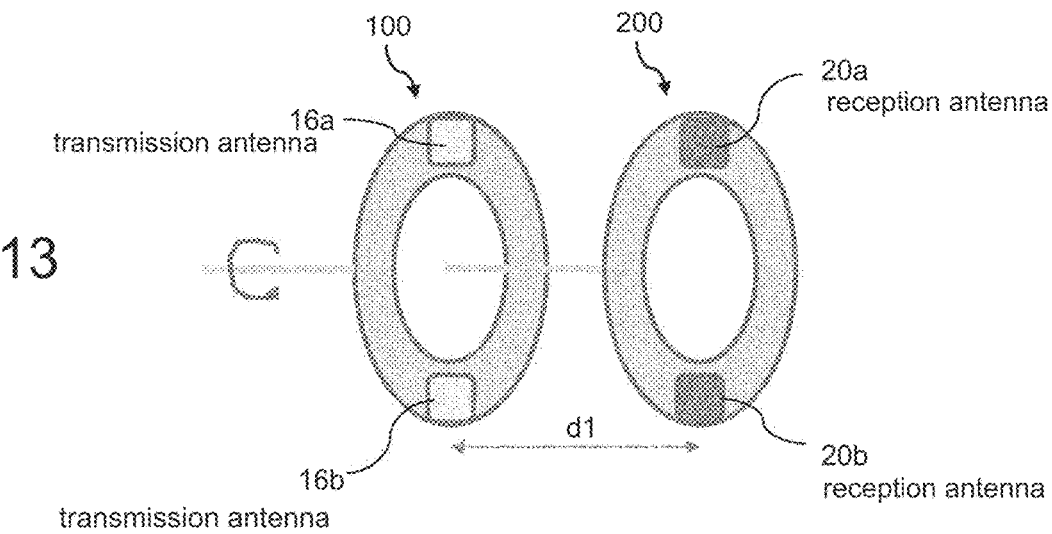
FIG. 13 is a view showing an example in which two transmission antennas 16 and two reception antennas 20 are provided in the rotating-side system 100 and the fixed-side system 200, respectively (multiple sets)

FIG. 13 is a view showing an example in which two transmission antennas 16 and two reception antennas 20 are provided in the rotating-side system 100 and the fixed-side system 200, respectively (multiple sets). As shown, the shorter one of the distances between the transmission antennas 16a, 16b and the reception antennas 20a, 20b is the distance d1 that is the same as in the case of the single antenna set, whereas the longer distance corresponds to a difference of 90 degrees in the circumferential direction and thus is considerably shorter.

Figure 14:
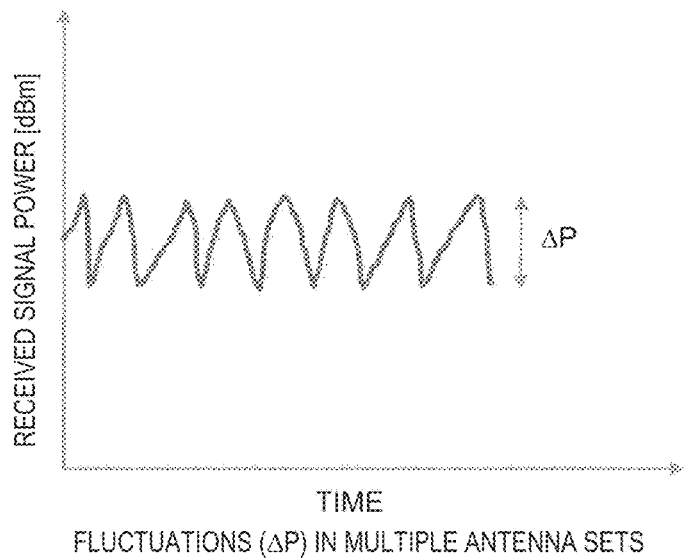
FIG. 14 is a graph showing changes over time in received signal power in the state shown in FIG. 13.

FIG. 14 is a graph showing changes over time in the received signal power in the state shown in FIG. 13. The fluctuation amount ΔP in the received signal power is considerably small compared with that in the case of the single antenna set, thus allowing for relatively good communication.

While each of the transmission antenna 16 and the reception antenna 20 includes multiple antennas in the above-described example, only either antenna may include multiple antennas.

The number of antennas to be installed can be changed according to the size and the operating frequency of the rotating-side system 100. Further, as the reception antenna 20 is provided in the fixed-side system 200 where there is often an extra area, many reception antennas 20 can also be provided.

Figure 15:
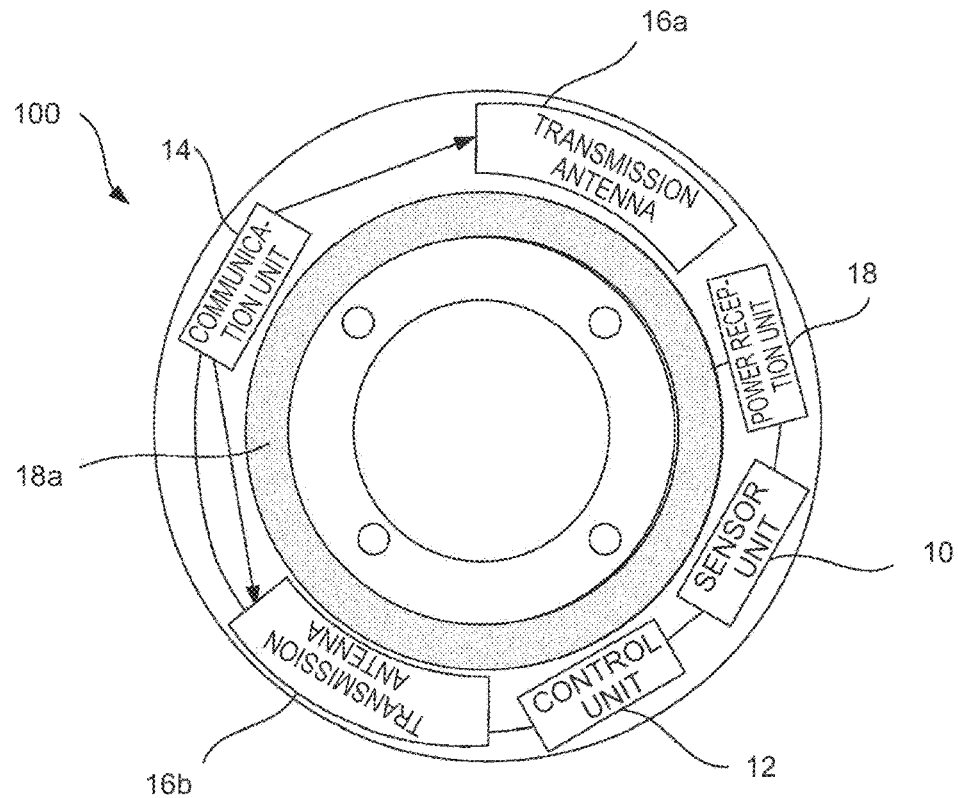
FIG. 15 is a schematic view showing the configuration of the rotating-side system 100 provided with two transmission antennas 16a, 16b.

FIG. 15 is a schematic view showing the configuration of the rotating-side system 100 provided with the two transmission antennas 16a, 16b. As shown, the transmission antennas 16a, 16b are disposed at symmetrical positions (positions 180 degrees apart from each other) relative to the center of the doughnut-shaped rotating-side system 100. The control unit 12, the sensor unit 10, and the power reception unit 18 are disposed on one side of the transmission antennas 16a, 16b, and the communication unit 14 is disposed on the other side. Transmission signals are supplied from the communication unit 14 to the two transmission antennas 16a, 16b. As in the example of the single antenna, detection signals from the sensor unit 10 are emitted as radio waves from the transmission antennas 16a, 16b through the control unit 12 and the communication unit 14 and electric power from the power reception unit 18 is supplied to the members.

Figure 16:
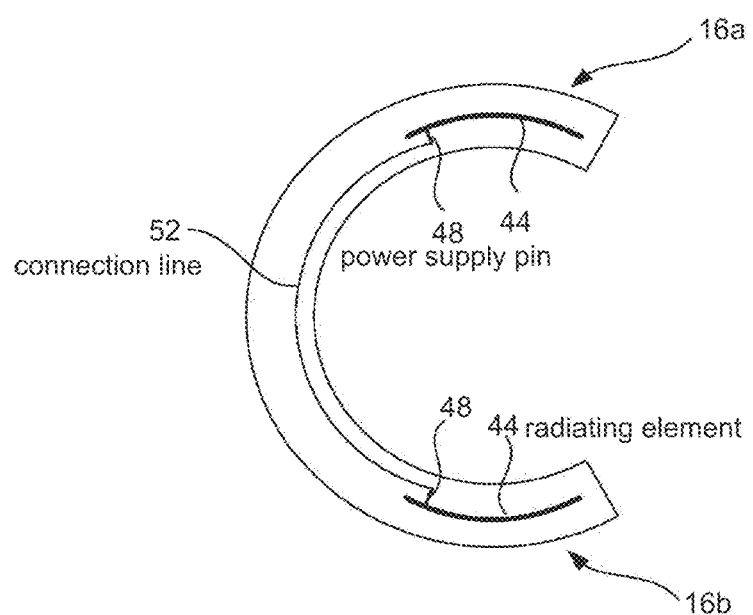
FIG. 16 is a view showing a connection line to the two transmission antennas 16a, 16b.

FIG. 16 is a view showing a connection line to the two transmission antennas 16a, 16b. As shown, the power supply pins 48 of the two transmission antennas 16a, 16b are connected to each other by a connection line 52, and transmission signals in the same phase are supplied to the two radiating elements 44 of the respective transmission antennas 16a, 16b.

As has been described, in this embodiment, multiple transmission antennas 16 or multiple reception antennas 20 are used. Thus, more stable reception signals can be obtained during rotational movement of a motor or the like.

Other Examples of Configuration of Antennas

Figure 17:
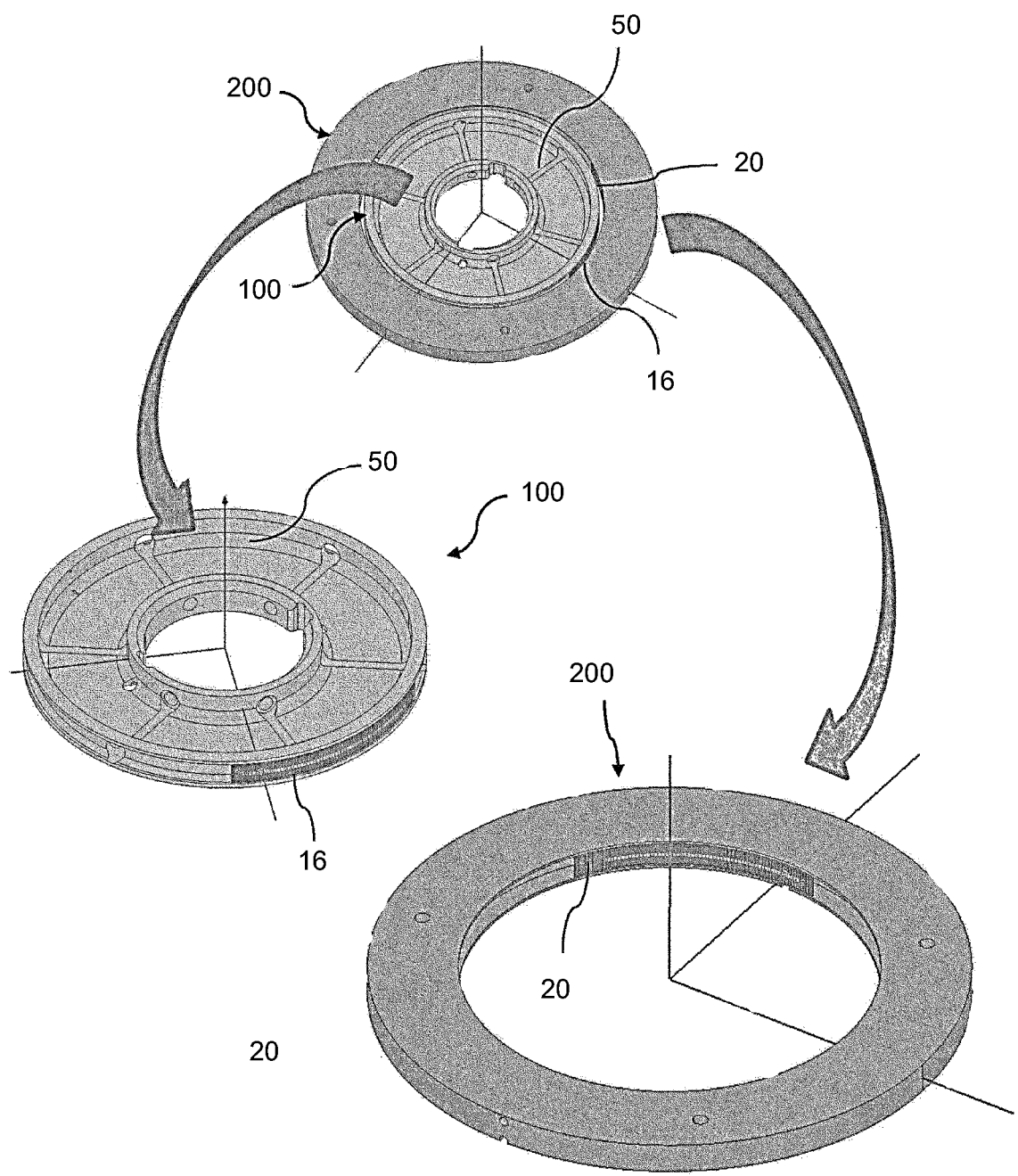
FIG. 17 is a view showing an example in which the transmission antenna 16 is disposed on an outer circumferential surface of a doughnut-shaped rotating-side system 100.

FIG. 17 is a view showing an example in which the transmission antenna 16 is disposed on an outer circumferential surface of the doughnut-shaped rotating-side system 100. In this configuration, the strip-shaped rotating-side system 100 is bent into an arc shape and disposed on an outer circumferential surface of the doughnut-shaped housing case 50. The reception antenna 20 is bent into an arc shape and disposed on an inner circumferential surface of the doughnut-shaped fixed-side system 200. Thus, the transmission antenna 16 and the reception antenna 20 face each other in a radial direction. Since the transmission antenna 16 rotates along with the rotor, once during each rotation, the transmission antenna 16 and the reception antenna 20 come to positions at which they fully face each other in the radial direction. The same configuration of connection can be adopted for the reception antennas 20a, 20b.

Figure 18:
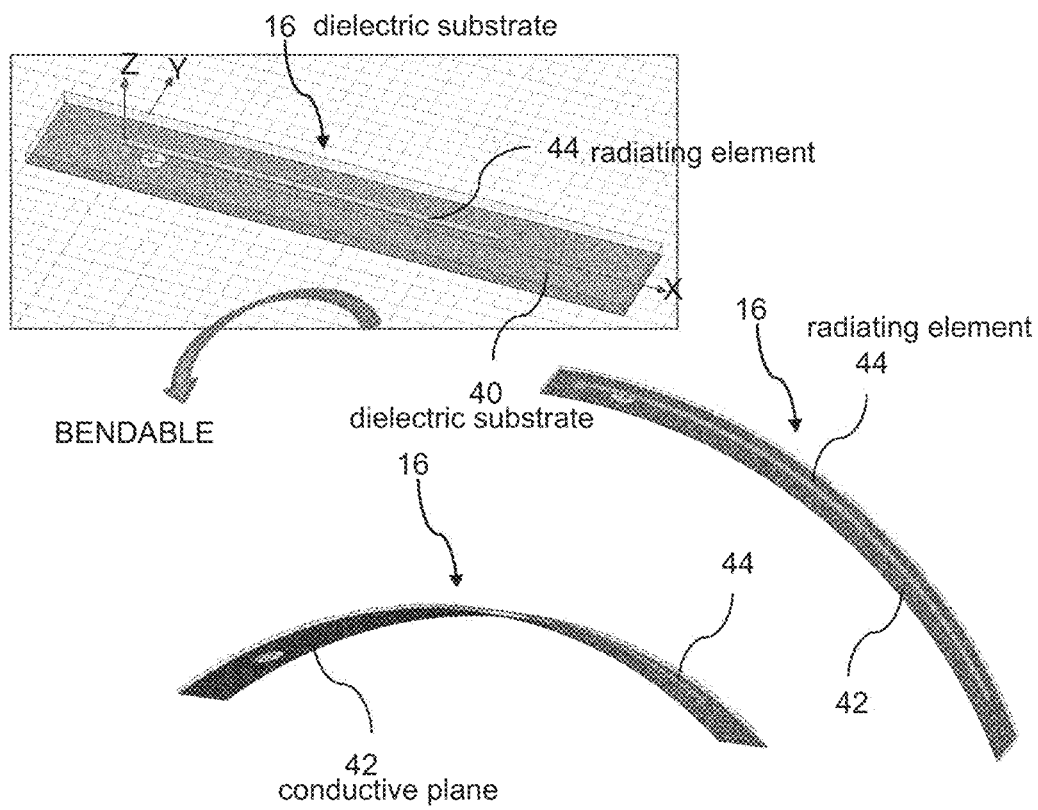
FIG. 18 is a view showing the configuration of the rotating-side system 100 in the example of FIG. 17.

FIG. 18 is a view showing the configuration of the rotating-side system 100 in the example of FIG. 17. As shown, the rotating-side system 100 has a strip shape, and is disposed with a thickness direction oriented in the radial direction and a longitudinal direction oriented in the circumferential direction such that the conductive plane 42 is located along the outer circumferential surface of the housing case 50.

Also in this example, multiple transmission antennas and multiple reception antennas can be provided.

Figure 19A:
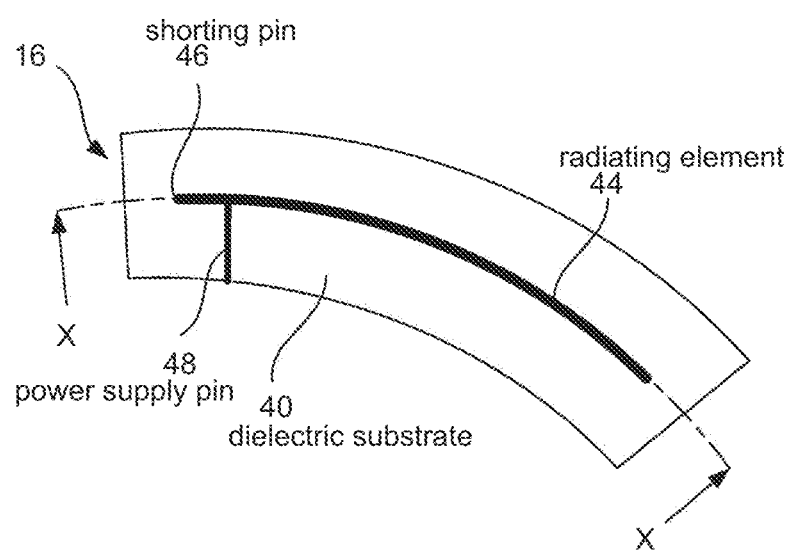
FIG. 19A is a plan view showing another example of the configuration of the antenna 16 (20)
Figure 19B:
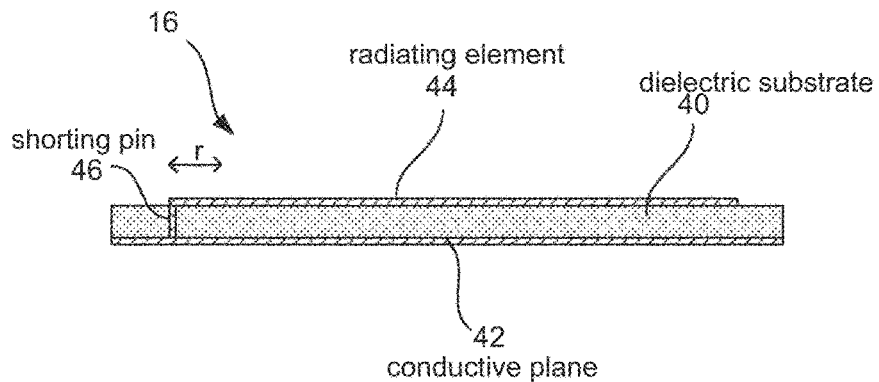
FIG. 19B is a sectional view, taken along line X-X, of the configuration of the antenna 16 (20) shown in FIG. 19A.
Figure 19C:
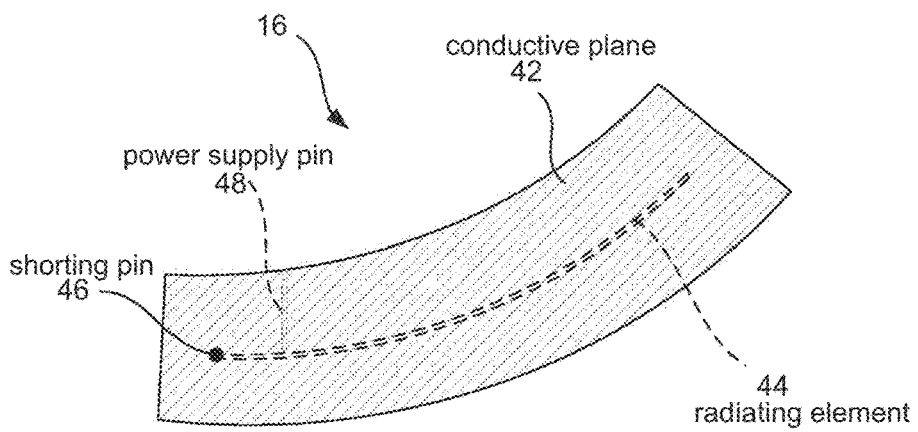
FIG. 19C is a bottom view of the antenna 16 (20) shown in FIG. 19A.

FIGS. 19A, 19B, and 19C are views showing another example of the configuration of the antenna 16 (20) that can be used as both the transmission antenna 16 and the reception antenna 20, with FIG. 19A being a view showing a planar shape, FIG. 19B being a sectional view showing a profile shape, and FIG. 19C being a bottom view.

As shown, as another form of the power supply pin 48 that supplies electric power to the radiating element 44 through the dielectric substrate 40, a power supply pin 48 that is a power supply wire laid on the front surface of the dielectric substrate 40 is connected to a point on the radiating element 44, a little (a predetermined distance: a few millimeters) away from the one end of the radiating element 44 (the connection point of the shorting pin 46). The other end of the power supply pin 48 reaches a side part (in this case, an inner end) of the dielectric substrate 40 and is connected to the power supply cable. Also in this configuration, the power supply pin 48 is connected to the power supply cable without being connected to the conductive plane 42. Transmission signals from the power supply cable are supplied to the radiating element 44 through the power supply pin 48 and emitted as radio waves from the radiating element 44. This example can produce effects similar to those of the above-described example.

Figure 20:
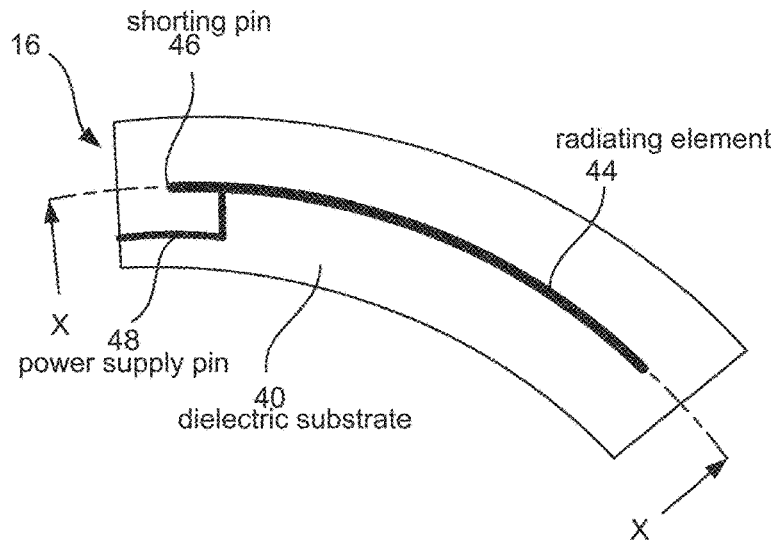
FIG. 20 is a plan view showing yet another example of the configuration of the antenna 16 (20).

FIG. 20 shows yet another example. In this example, the power supply pin 48 is connected to the power supply cable by temporarily extending toward the inner side and then bending at a right angle and reaching an end of the dielectric substrate 40 in the circumferential direction.

In the above-described two examples, a part of the power supply pin 48 that extends in the radial direction may be oriented in an outward direction.

What is claimed is:

1. An antenna, comprising:
   a dielectric substrate;
   a conductive plane formed on a back surface of the dielectric substrate;
   a radiating element having a linear shape and formed on a front surface of the dielectric substrate;
   a shorting pin connecting one end of the radiating element to the conductive plane; and
   a power supply pin that is connected to the radiating element through the dielectric substrate, at a point a predetermined distance away from the one end of the radiating element to which the shorting pin is connected, the power supply pin being configured to supply a transmission signal to the radiating element,
   wherein
   the radiating element is configured to emit a radio wave corresponding to the transmission signal, and the predetermined distance is defined from the shorting pin to the power supply pin.

2. The antenna according to claim 1, wherein the power supply pin passes through an inside of the dielectric substrate and reaches a side of the back surface of the dielectric substrate through a hole provided in the conductive plane.

3. The antenna according to claim 1, wherein the power supply pin extends over the dielectric substrate and reaches a side surface of the dielectric substrate.

4. The antenna according to claim 1, wherein a planar shape of the dielectric substrate in a plane parallel to the front surface of the dielectric substrate and the back surface of the dielectric substrate is a quadrangle curved into an arc shape of the radiating element, and planar shapes of the conductive plane and the radiating element are also quadrangles curved into arc shapes.

5. The antenna according to claim 4, wherein the predetermined distance from the shorting pin to the power supply pin extends along the arc shape of the radiating element.

6. The antenna according to claim 5, wherein the predetermined distance from the shorting pin to the power supply pin is in a range between two degrees and six degrees.

7. The antenna according to claim 5, wherein an angular difference between the shorting pin and the power supply pin is three degrees.

8. The antenna according to claim 1, wherein a profile shape of the dielectric substrate orthogonal to the front surface of the radiating element and the back surface of the radiating element is a quadrangle curved into an arc shape of the radiating element, and profile shapes of the conductive plane and the radiating element are also quadrangles curved into arc shapes.

9. The antenna according to claim 8, wherein the predetermined distance extends along the arc shape of the radiating element.

10. The antenna according to claim 9, wherein the predetermined distance from the shorting pin to the power supply pin is in a range between two degrees and six degrees.

11. The antenna according to claim 9, wherein an angular difference between the shorting pin and the power supply pin is three degrees.

12. A telemetric device, comprising:
a sensor unit configured to obtain a detection signal;
a processor configured to process the detection signal from the sensor unit to obtain a transmission signal; and
a transmission antenna configured to transmit the transmission signal from the processor,
wherein
the transmission antenna includes:
a dielectric substrate;
a conductive plane formed on a back surface of the dielectric substrate;
a radiating element having a linear shape and formed on a front surface of the dielectric substrate;
a shorting pin connecting one end of the radiating element to the conductive plane; and
a power supply pin that is connected to the radiating element through the dielectric substrate, at a point a predetermined distance away from the one end of the radiating element to which the shorting pin is connected, and the power supply pin being configured to supply the transmission signal to the radiating element, and wherein
the radiating element is configured to emit a radio wave corresponding to the transmission signal, and the predetermined distance is defined from the shorting pin to the power supply pin.

13. The telemetric device according to claim 12, wherein the power supply pin passes through an inside of the dielectric substrate and reaches a side of the back surface of the dielectric substrate through a hole provided in the conductive plane.

14. The telemetric device according to claim 12, wherein the power supply pin extends over the dielectric substrate and reaches a side surface of the dielectric substrate.

15. The telemetric device according to claim 12, wherein, in the transmission antenna, a planar shape of the dielectric substrate in a plane parallel to the front surface of the dielectric substrate and the back surface of the dielectric substrate is a quadrangle curved into an arc shape of the radiating element, and planar shapes of the conductive plane and the radiating element are also quadrangles curved into arc shapes.

16. The telemetric device according to claim 12, wherein, in the transmission antenna, a profile shape of the dielectric substrate orthogonal to the front surface of the dielectric substrate and the back surface of the dielectric substrate is a quadrangle curved into an arc shape of the radiating element, and profile shapes of the conductive plane and the radiating element are also quadrangles curved into arc shapes.

17. The telemetric device according to claim 12, wherein the transmission antenna comprises first and second transmission antennas which are configured to emit same transmission signals.

18. The telemetric device according to claim 12, further comprising a power reception unit that is configured to receive the radio wave corresponding to the transmission signal from an outside and outputs output electric power to the sensor unit and the processor.

19. A telemetric measurement system, comprising:
a telemetric device configured to be mounted on a rotating member of a rotating machine, wherein the telemetric device includes:
a sensor unit configured to obtain a detection signal;
a processor configured to process the detection signal from the sensor unit to obtain a transmission signal; and
a transmission antenna configured to transmit the transmission signal from the processor, wherein the transmission antenna includes:
a dielectric substrate;
a conductive plane formed on a back surface of the dielectric substrate;
a radiating element having a linear shape and formed on a front surface of the dielectric substrate;
a shorting pin connecting one end of the radiating element to the conductive plane; and
a power supply pin that is connected to the radiating element through the dielectric substrate, at a point a predetermined distance away from the one end of the radiating element to which the shorting pin is connected, the power supply pin being configured to supply the transmission signal to the radiating element,
wherein the radiating element is configured to emit a radio wave corresponding to the transmission signal, and
the predetermined distance is defined from the shorting pin to the power supply pin; and
a reception antenna provided on a fixed member of the rotating machine, and configured to receive the transmission signal from the transmission antenna of the telemetric device.

* * * * *